United States Patent
Yu et al.

(10) Patent No.: US 11,183,711 B2
(45) Date of Patent: Nov. 23, 2021

(54) NON-AQUEOUS ELECTROLYTE SOLUTION FOR LITHIUM SECONDARY BATTERY AND LITHIUM SECONDARY BATTERY INCLUDING THE SAME

(71) Applicant: LG Chem, Ltd., Seoul (KR)

(72) Inventors: Sung Hoon Yu, Daejeon (KR); Chul Haeng Lee, Daejeon (KR); Hyun Seung Kim, Daejeon (KR)

(73) Assignee: LG Chem, Ltd.

( * ) Notice: Subject to any disclaimer, the term of this patent is extended or adjusted under 35 U.S.C. 154(b) by 75 days.

(21) Appl. No.: 16/606,852

(22) PCT Filed: Sep. 20, 2018

(86) PCT No.: PCT/KR2018/011190
§ 371 (c)(1),
(2) Date: Oct. 21, 2019

(87) PCT Pub. No.: WO2019/059694
PCT Pub. Date: Mar. 28, 2019

(65) Prior Publication Data
US 2020/0052322 A1    Feb. 13, 2020

(30) Foreign Application Priority Data

Sep. 21, 2017  (KR) .................. 10-2017-0121950
Sep. 19, 2018  (KR) .................. 10-2018-0112330

(51) Int. Cl.
H01M 10/0567    (2010.01)
H01M 10/052    (2010.01)
H01M 10/0525    (2010.01)

(52) U.S. Cl.
CPC ..... *H01M 10/0567* (2013.01); *H01M 10/052* (2013.01); *H01M 10/0525* (2013.01); *H01M 2300/0025* (2013.01); *Y02E 60/10* (2013.01)

(58) Field of Classification Search
None
See application file for complete search history.

(56) References Cited

U.S. PATENT DOCUMENTS

| | | | |
|---|---|---|---|
| 6,479,191 B1 | 11/2002 | Hamamoto et al. | |
| 2008/0107969 A1 | 5/2008 | Abe et al. | |
| 2014/0120414 A1 | 5/2014 | Bhat et al. | |
| 2015/0050562 A1 | 2/2015 | Abe et al. | |
| 2017/0061464 A1 | 3/2017 | Lee et al. | |
| 2017/0317384 A1 | 11/2017 | Oomuro et al. | |
| 2017/0373348 A1 | 12/2017 | Abe et al. | |
| 2018/0191031 A1 | 7/2018 | Yu et al. | |
| 2018/0301758 A1 | 10/2018 | Abe et al. | |

FOREIGN PATENT DOCUMENTS

| | | |
|---|---|---|
| CN | 105609877 A | 5/2016 |
| EP | 2768064 A1 | 8/2014 |
| EP | 2830142 A1 | 1/2015 |
| EP | 3012896 A1 | 4/2016 |
| JP | 2000195545 A | 7/2000 |
| JP | 2002100399 A | 4/2002 |
| JP | 200766864 A | 3/2007 |
| JP | 201027361 A | 2/2010 |
| JP | 2011-238373 | * 11/2011 |
| JP | 2011238373 A | 11/2011 |
| JP | 2013206708 A | 10/2013 |
| JP | 2016100100 A | 5/2016 |
| JP | 2017027930 A | 2/2017 |
| KR | 20090088366 A | 8/2009 |
| KR | 20170051287 A | 5/2017 |
| KR | 20170068595 A | 6/2017 |
| WO | 2013141345 A1 | 9/2013 |
| WO | 2016104468 A1 | 6/2016 |
| WO | 2017061464 A1 | 4/2017 |

OTHER PUBLICATIONS

International Search Report from Application No. PCT/KR2018/011190 dated Mar. 22, 2019, 2 pages.
Partial Supplementary European Search Report including Provisional Opinion for Application No. EP18857655.7, dated May 19, 2020, pp. 1-15.
International Search Report for Application EP18857655, dated Aug. 31, 2020, 16 pages.
Partial European Search Report for Application No. EP20185671, dated Oct. 14, 2020, pp. 1-16.

* cited by examiner

*Primary Examiner* — Laura Weiner
(74) *Attorney, Agent, or Firm* — Lerner, David, Littenberg, Krumholz & Mentlik, LLP

(57) ABSTRACT

A non-aqueous electrolyte solution for a lithium secondary battery and a lithium secondary battery including the same are disclosed herein. In an embodiment, the electrolyte solution includes a lithium salt, an organic solvent, a compound represented by Formula 1 as a first additive, lithium difluorophosphate (LiDFP) as a second additive, wherein the first additive and the second additive are each independently included in an amount of 0.01 wt % to 8.5 wt % based on a total amount of the non-aqueous electrolyte solution. The first additive has metal ion adsorbability and is capable of forming a stable ion conductive film on the surface of an electrode, and a lithium secondary battery in which an abnormal voltage drop phenomenon is improved by including the same.

8 Claims, No Drawings

NON-AQUEOUS ELECTROLYTE SOLUTION FOR LITHIUM SECONDARY BATTERY AND LITHIUM SECONDARY BATTERY INCLUDING THE SAME

CROSS-REFERENCE TO RELATED APPLICATIONS

The present application is a national phase entry under 35 U.S.C. § 371 of International Application No. PCT/KR2018/011190, filed on Sep. 20, 2018, which claims priority from Korean Patent Application Nos. 2017-0121950, filed on Sep. 21, 2017, and 2018-0112330, filed on Sep. 19, 2018, the disclosures of which are incorporated by reference herein.

TECHNICAL FIELD

The present invention relates to a non-aqueous electrolyte solution for a lithium secondary battery and a lithium secondary battery including the same.

BACKGROUND ART

In line with miniaturization, lightweight, thin profile, and portable trends in electronic devices according to the development of information and telecommunications industry, the need for high energy density batteries used as power sources of such electronic devices has increased.

Lithium secondary batteries, specifically, lithium ion batteries (LIB), as batteries that may best meet the need, have been adopted as power sources of many portable devices due to high energy density and ease of design.

Recently, a lithium secondary battery, which may maintain excellent performance not only at room temperature but also in a more severe outside environment such as a high-temperature or low-temperature environment, is required as the range of the lithium secondary batteries used has expanded from conventional small electronic devices to large electronic devices, cars, or smart grids.

A lithium secondary battery currently used is composed of a carbon-based negative electrode capable of intercalating and deintercalating lithium ions, a positive electrode formed of lithium-containing oxide, and a non-aqueous electrolyte solution in which an appropriate amount of a lithium salt is dissolved in a mixed carbonate-based organic solvent, wherein charge and discharge may be possible, because lithium ions, which are deintercalated from the positive electrode by charging, transfer energy while a phenomenon is repeated in which the lithium ions are intercalated into the negative electrode, for example, carbon particles, and deintercalated during discharging.

Metal ions are dissolved from the surface of the positive electrode while a positive electrode active material is structurally collapsed as charge and discharge of the lithium secondary battery proceed. The dissolved metal ions are electrodeposited on the negative electrode to degrade the negative electrode. The degradation phenomenon tends to be further accelerated when the potential of the positive electrode is increased or the battery is exposed to high temperature.

In order to address this limitation, a method of adding compounds capable of forming a protective layer such as a solid electrolyte interface (SEI) on the surface of the negative electrode in the non-aqueous electrolyte solution has been suggested.

However, a case may occur in which overall performance of the secondary battery is degraded as other side effects are caused by the electrolyte solution additives.

Thus, there is a continuous need to develop a non-aqueous electrolyte solution containing an additive which may improve performance and stability of the battery while minimizing the side effects.

PRIOR ART DOCUMENT

Japanese Patent Application Laid-open Publication No. 2007-066864

DISCLOSURE OF THE INVENTION

Technical Problem

An aspect of the present invention provides a non-aqueous electrolyte solution for a lithium secondary battery which includes an additive having metal ion adsorbability and capable of forming a stable ion conductive film on the surface of an electrode.

Another aspect of the present invention provides a lithium secondary battery in which an abnormal voltage drop phenomenon is improved by including the non-aqueous electrolyte solution for a lithium secondary battery.

Technical Solution

According to an aspect of the present invention, there is provided a non-aqueous electrolyte solution for a lithium secondary battery including:

a lithium salt;
an organic solvent;
a compound represented by Formula 1 as a first additive; and
lithium difluorophosphate ($LiPO_2F_2$, hereinafter, referred to as "LiDFP") as a second additive,
wherein the first additive and the second additive are each independently included in an amount of 0.01 wt % to 8.5 wt % based on a total amount of the non-aqueous electrolyte solution.

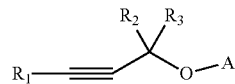

(Formula 1)

In Formula 1, $R_1$ to $R_3$ are each independently hydrogen or a substituted or unsubstituted alkyl group having 1 to 6 carbon atoms, and A is,

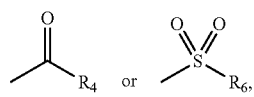

wherein $R_4$ and $R_6$ are each independently a substituted or unsubstituted alkyl group having 1 to 6 carbon atoms, a substituted or unsubstituted aryl group having 6 to 12 carbon atoms, or —O—$R_5$; and $R_5$ is a substituted or unsubstituted alkyl group having 1 to 6 carbon atoms, a substituted or unsubstituted alkynyl group having 2 to 6 carbon atoms, or a substituted or unsubstituted aryl group having 6 to 12 carbon atoms.

Specifically, the substituted alkyl group having 1 to 6 carbon atoms is an alkyl group having 1 to 6 carbon atoms which is substituted with at least one halogen element or an alkyl group having 1 to 6 carbon atoms which is substituted with an alkyl group having 1 to 3 carbon atoms, wherein the halogen element is preferably fluorine.

Also, the substituted aryl group having 6 to 12 carbon atoms is a phenyl group substituted with at least one halogen element or a phenyl group substituted with an alkyl group having 1 to 3 carbon atoms, wherein the halogen element is preferably fluorine. The unsubstituted aryl group having 6 to 12 carbon atoms is a phenyl group.

Furthermore, the compound represented by Formula 1, as the first additive, may include at least one selected from the group consisting of compounds represented by Formulae 1a to 1p.

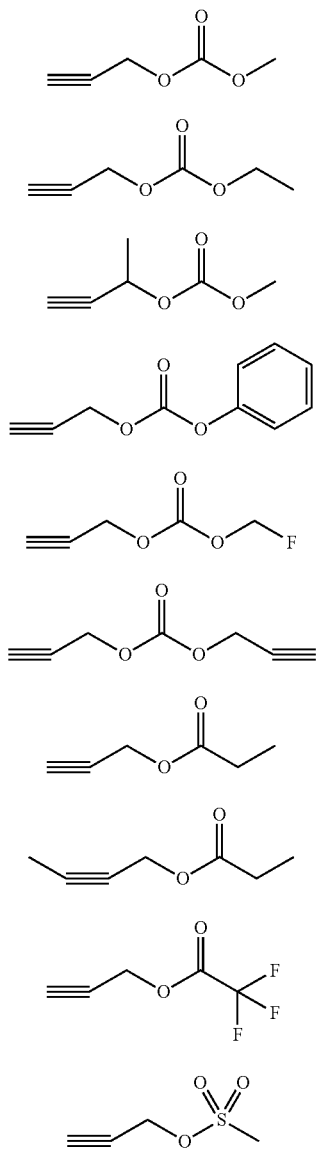

(Formula 1a)
(Formula 1b)
(Formula 1c)
(Formula 1d)
(Formula 1e)
(Formula 1f)
(Formula 1g)
(Formula 1h)
(Formula 1i)
(Formula 1j)

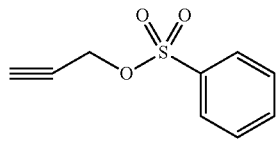

(Formula 1k)

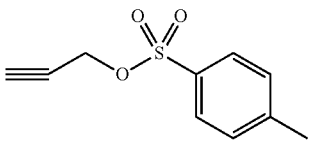

(Formula 1l)

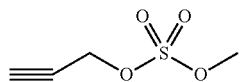

(Formula 1m)

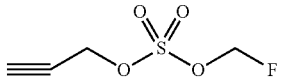

(Formula 1n)

(Formula 1o)

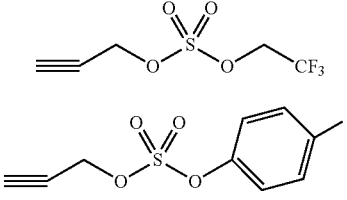

(Formula 1p)

The compound represented by Formula 1, as the first additive, may be included in an amount of 0.1 wt % to 7 wt %, for example, 0.1 wt % to 5 wt % based on a total weight of the non-aqueous electrolyte solution for a lithium secondary battery.

The lithium difluorophosphate, as the second additive, is included in an weight of 0.1 wt % to 7 wt %, for example, 0.1 wt % to 5 wt % based on the total weight of the non-aqueous electrolyte solution for a lithium secondary battery.

The non-aqueous electrolyte solution may further include tetravinylsilane as a third additive.

According to another aspect of the present invention, there is provided a lithium secondary battery including the non-aqueous electrolyte solution for a lithium secondary battery of the present invention.

Advantageous Effects

According to the present invention, a non-aqueous electrolyte solution, which may form a film having excellent stability on a surface of an electrode and may suppress a side effect in a battery caused by positive electrode metal ions or metallic foreign matter that may be included in the preparation process, may be prepared by including a compound containing a propargyl group having metal ion adsorbability, as a first additive, and a second additive in the form of a salt, such as lithium difluorophosphate (LiDFP). Also, a lithium secondary battery may be prepared in which an abnormal voltage drop phenomenon during high-temperature storage is improved and cycle life characteristics and high-temperature storage performance are improved even during high-voltage charging by including the non-aqueous electrolyte solution.

MODE FOR CARRYING OUT THE INVENTION

Hereinafter, the present invention will be described in more detail.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

It will be further understood that the terms "include," "comprise," or "have" when used in this specification, specify the presence of stated features, numbers, steps, elements, or combinations thereof, but do not preclude the presence or addition of one or more other features, numbers, steps, elements, or combinations thereof.

Before describing the present invention, the expressions "a" and "b" in the description of "a to b carbon atoms" in the specification each denote the number of carbon atoms included in a specific functional group. That is, the functional group may include "a" to "b" carbon atoms. For example, the expression "alkyl group having 1 to 5 carbon atoms" denotes an alkyl group including 1 to 5 carbon atoms, that is, —$CH_3$, —$CH_2CH_3$, —$CH_2CH_2CH_3$, —$CH_2(CH_2)CH_3$, —$CH(CH_2)CH_3$, and —$CH(CH_2)CH_2CH_3$.

Also, in the present specification, the expression "aryl group" denotes a functional group in which one hydrogen atom is subtracted from an aromatic hydrocarbon group, wherein the aryl group includes a phenyl group, a tolyl group, a xylene group, or a naphthyl group.

Furthermore, unless otherwise defined in the specification, the expression "substitution" denotes that at least one hydrogen bonded to carbon is substituted with an element other than hydrogen, for example, an alkyl group having 1 to 5 carbon atoms or at least one fluorine atom.

Also, in the present specification, the expression "%" denotes wt % unless otherwise indicated explicitly.

In general, when overcharging of a secondary battery occurs, a structure of a positive electrode active material becomes in an unstable state while an excessive amount of lithium ions is discharged from a positive electrode. As a result, oxygen is released from the positive electrode active material, and the released oxygen causes a decomposition reaction of an electrolyte solution. The dissolution of metallic foreign matter, such as cobalt (Co), manganese (Mn), and nickel (Ni), from the positive electrode active material is increased by structural collapse of the positive electrode active material and a side reaction with the electrolyte solution, and the dissolved metallic foreign matter moves to a negative electrode and precipitates as dendrites on a surface of the negative electrode to cause a micro-short circuit between the positive electrode and the negative electrode. Overall performance of the battery is degraded while an abnormal voltage drop phenomenon, in which a voltage of the battery is reduced, occurs due to the short circuit. In this case, the low-voltage phenomenon may also be caused by metallic foreign matter which is included in raw materials of the lithium battery or incorporated in a preparation process.

In the present invention, in order to improve these limitations, provided is a non-aqueous electrolyte solution which includes a compound, which performs a passivation function to prevent the dissolved metallic foreign matter from growing on the surface of the negative electrode as dendrites by adsorbing metal ions, as a first additive, and a compound capable of forming a film having improved thermal stability on the surface of the electrode as a second additive.

Also, in the present invention, provided is a lithium secondary battery in which the abnormal voltage drop phenomenon during high-temperature storage is improved and cycle life characteristics and high-temperature storage performance are improved even during high-voltage charging by including the non-aqueous electrolyte solution.

Non-Aqueous Electrolyte Solution

Specifically, in an embodiment of the present invention, provided is a non-aqueous electrolyte solution for a lithium secondary battery including:

a lithium salt;

an organic solvent;

a compound represented by Formula 1 as a first additive; and lithium difluorophosphate (LiDFP) as a second additive, wherein the first additive and the second additive are each independently included in an amount of 0.01 wt % to 8.5 wt % based on a total amount of the non-aqueous electrolyte solution.

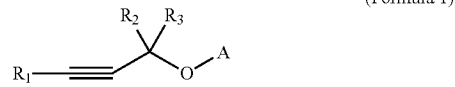
(Formula 1)

In Formula 1, $R_1$ to $R_3$ are each independently hydrogen or a substituted or unsubstituted alkyl group having 1 to 6 carbon atoms, and A is,

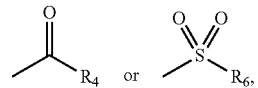

wherein $R_4$ and $R_6$ are each independently a substituted or unsubstituted alkyl group having 1 to 6 carbon atoms, a substituted or unsubstituted aryl group having 6 to 12 carbon atoms, or —O—$R_5$; and $R_5$ is a substituted or unsubstituted alkyl group having 1 to 6 carbon atoms, a substituted or unsubstituted alkynyl group having 2 to 6 carbon atoms, or a substituted or unsubstituted aryl group having 6 to 12 carbon atoms.

Specifically, the substituted alkyl group having 1 to 6 carbon atoms is an alkyl group having 1 to 6 carbon atoms which is substituted with at least one halogen element or an alkyl group having 1 to 6 carbon atoms which is substituted with an alkyl group having 1 to 3 carbon atoms, wherein the halogen element is preferably fluorine.

Also, the substituted aryl group having 6 to 12 carbon atoms is a phenyl group substituted with at least one halogen element or a phenyl group substituted with an alkyl group having 1 to 3 carbon atoms, wherein the halogen element is preferably fluorine. The unsubstituted aryl group having 6 to 12 carbon atoms is a phenyl group.

(1) Lithium Salt

First, in the non-aqueous electrolyte solution for a secondary battery according to the embodiment of the present invention, any lithium salt typically used in an electrolyte solution for a lithium secondary battery may be used as the above lithium salt without limitation, and, for example, the lithium salt may include $Li^+$ as a cation, and may include at least one selected from the group consisting of $F^-$, $Cl^-$, $Br^-$, $I^-$, $NO_3^-$, $N(CN)_2^-$, $BF_4^-$, $ClO_4^-$, $B_{10}Cl_{10}^-$, $AlO_4^-$, $AlCl_4^-$, $PF_6^-$, $SbF_6^-$, $AsF_6^-$, $BF_2C_2O_4^-$, $BC_4O_8^-$, $PF_4C_2O_4^-$, $PF_2C_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$ as an anion. Specifically, the lithium salt may include a single material selected from the group consisting of LiCl, LiBr, LiI, LiBF$_4$, LiClO$_4$, LiB$_{10}$Cl$_{10}$, LiAlO$_4$, LiAlCl$_4$, LiPF$_6$, LiSbF$_6$, LiAsF$_6$, LiCF$_3$SO$_3$, LiCF$_3$CO$_2$, LiCH$_3$CO$_2$, lithium bisperfluoroethanesulfonimide (LiBETI, LiN(SO$_2$CF$_2$CF$_3$)$_2$), lithium fluorosulfonyl imide (LiFSI, LiN(SO$_2$F)$_2$), and lithium (bis)trifluoromethanesulfonimide (LiTFSI, LiN(SO$_2$CF$_3$)$_2$) or a mixture of two or more thereof. Furthermore, the lithium salt may specifically include a single material selected from the group consisting of LiPF$_6$, LiBF$_4$, LiCH$_3$CO$_2$, LiCF$_3$CO$_2$, LiFSI, LiTFSI, and LiBETI, or a mixture of two or more thereof. However, the lithium salt does not include LiDFP, as a lithium salt of the second additive.

The lithium salt may be appropriately changed in a normally usable range, but may be included in a concentration of 0.1 M to 3 M, for example, 0.8 M to 2.5 M in the electrolyte solution. In a case in which the concentration of the lithium salt is 0.1 M or less, cycle life characteristics and capacity characteristics of the lithium secondary battery may be degraded, and, in a case in which the concentration of the lithium salt is greater than 3 M, a film-forming effect may be relatively reduced.

(2) Organic Solvent

The organic solvent is not limited as long as it may minimize decomposition due to an oxidation reaction during charge and discharge of the secondary battery and may exhibit desired characteristics with the additive. For example, an ether-based solvent, an ester-based solvent, or an amide-based solvent may be used alone or as a mixture of two or more thereof.

As the ether-based solvent among the organic solvents, any one selected from the group consisting of dimethyl ether, diethyl ether, dipropyl ether, methylethyl ether, methylpropyl ether, and ethylpropyl ether, or a mixture of two or more thereof may be used, but the present invention is not limited thereto.

Furthermore, the ester-based solvent may include at least one compound selected from the group consisting of a cyclic carbonate compound, a linear carbonate compound, a linear ester compound, and a cyclic ester compound.

Among these compounds, specific examples of the cyclic carbonate compound may be any one selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, and fluoroethylene carbonate (FEC), or a mixture of two or more thereof.

Also, specific examples of the linear carbonate compound may be any one selected from the group consisting of dimethyl carbonate (DMC), diethyl carbonate (DEC), dipropyl carbonate, ethylmethyl carbonate (EMC), methylpropyl carbonate, and ethylpropyl carbonate, or a mixture of two or more thereof, but the present invention is not limited thereto.

Specific examples of the linear ester compound may be any one selected from the group consisting of methyl acetate, ethyl acetate, propyl acetate, methyl propionate, ethyl propionate, propyl propionate, and butyl propionate, or a mixture of two or more thereof, but the present invention is not limited thereto.

Specific examples of the cyclic ester compound may be any one selected from the group consisting of γ-butyrolactone, γ-valerolactone, γ-caprolactone, σ-valerolactone, and ε-caprolactone, or a mixture of two or more thereof, but the present invention is not limited thereto.

Particularly, among the ester-based solvents, since the cyclic carbonate-based compound well dissociates the lithium salt in the electrolyte due to high permittivity as a highly viscous organic solvent. Thus, an electrolyte solution having high electrical conductivity may be prepared when the above cyclic carbonate-based compound is mixed with the low viscosity, low permittivity linear carbonate-based compound, such as dimethyl carbonate and diethyl carbonate, in an appropriate ratio and used.

(3) First Additive

Also, the non-aqueous electrolyte solution according to the embodiment of the present invention may include a compound represented by Formula 1 as a first additive.

That is, since the compound represented by Formula 1, which is included as the first additive, includes both (i) a propargyl group having a triple bond which is known to have metal ion adsorbability and (ii) an oxygen atom in its structure, the compound represented by Formula 1 may easily adsorb on metallic foreign matter, such as iron (Fe), Co, Mn, and Ni, dissolved from the positive electrode or metallic foreign matter, such as copper (Cu), dissolved from the negative electrode during charge and discharge, or metallic foreign matter incorporated from raw materials or in the preparation process. As a result, since the compound represented by Formula 1 may suppress the growth of the dissolved metallic foreign matter into dendrites on the negative electrode, the abnormal voltage drop phenomenon during high-temperature storage due to the dissolved metallic foreign matter may be improved.

Furthermore, since the compound represented by Formula 1 containing the propargyl group may be reduced on the surface of the negative electrode to form a stable ion conductive film on the surface of the negative electrode when a predetermined voltage is reached during charge and discharge, an additional electrolyte solution decomposition reaction may be suppressed and, furthermore, the abnormal voltage drop phenomenon of the secondary battery, cycle life characteristics, and high-temperature storage performance may be improved by facilitating intercalation and deintercalation of lithium ions into and from the negative electrode even during overcharge or high-temperature storage.

The compound represented by Formula 1, which is included as the first additive, may be at least one selected from the group consisting of compounds represented by Formulae 1a to 1p below.

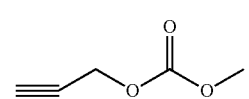

(Formula 1a)

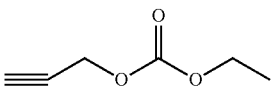

(Formula 1b)

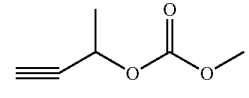

(Formula 1c)

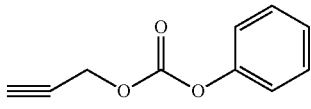

(Formula 1d)

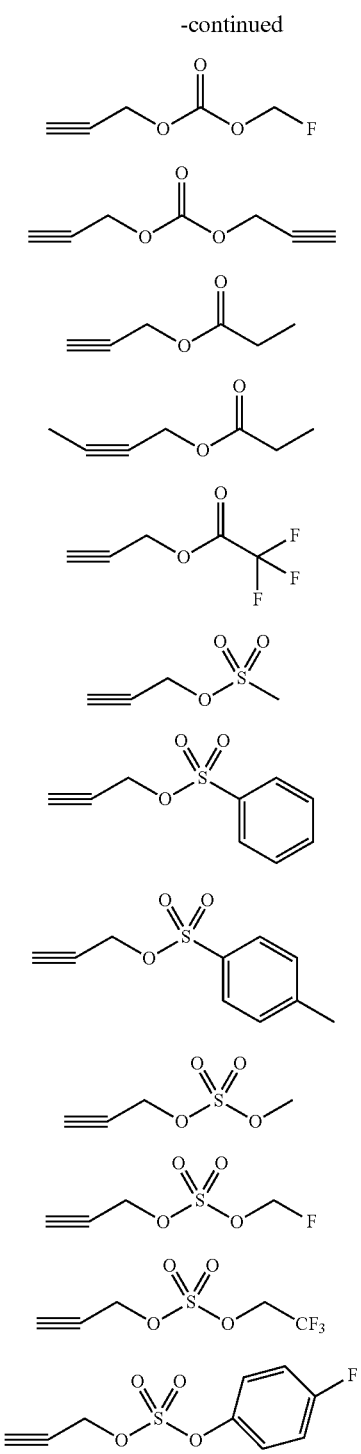

(Formula 1e)
(Formula 1f)
(Formula 1g)
(Formula 1h)
(Formula 1i)
(Formula 1j)
(Formula 1k)
(Formula 1l)
(Formula 1m)
(Formula 1n)
(Formula 1o)
(Formula 1p)

Specifically, the compound represented by Formula 1 may be at least one selected from the group consisting of compounds represented by Formulae 1a to 1f.

That is, since the compounds represented by Formulae 1a to 1f contain a "—$OCO_2R_4$" group having a size smaller than that of a sulfonate anion contained in the compounds represented by Formulae 1j to 1l, the reactivity with a carbonate-based organic solvent, such as ethylene carbonate, is better while aggressiveness of anions is increased. Thus, the compounds represented by Formulae 1a to 1f may form a passive film having higher stability on the surface of the electrode in comparison to the compounds represented by Formulae 1j to 1l.

Also, with respect to the compounds represented by Formulae 1m to 1p containing a —$OSO_2$—$OR_5$ group in which an oxygen-containing alkoxide group (—OR), as an electron-withdrawing group, is bonded to a '—$OSO_2$—' group, since reduction decomposition is easier, the compounds represented by Formulae 1m to 1p may form a film having higher stability in comparison to the compounds represented by Formulae 1j to 1l in which '$R_6$', which is a functional group providing a delocalized negative charge not containing oxygen, is directly bonded to the '$OSO_2$' group.

The compound represented by Formula 1, as the first additive, may be included in an weight of 0.01 wt % to 8.5 wt %, particularly 0.1 wt % to 7 wt %, more particularly 0.1 wt % to 5 wt %, and most particularly 0.5 wt % to 3 wt % based on the total amount of the non-aqueous electrolyte solution.

In a case in which the compound represented by Formula 1 is included in an amount within the above range, a secondary battery having more improved overall performance may be prepared. For example, when the amount of the first additive is less than 0.01 wt %, an effect of improving the abnormal voltage drop phenomenon may be insignificant. Specifically, when the amount of the first additive is 0.1 wt % or more, for example, 0.5 wt % or more, a stabilization effect or dissolution suppression effect may be obtained during the formation of a solid electrolyte interface (SEI) while suppressing an increase in resistance as much as possible, and, when the amount of the additive is 7 wt % or less, for example, 5 wt % or less, the maximum dissolution suppression effect may be obtained within the increase in resistance which may be accommodated.

Typically, in a lithium secondary battery, a kind of passivation layer is formed at a position where surface bonding exists at a positive electrode of the battery or at an activated position during charge and discharge by an electrochemical oxidation decomposition reaction of an electrolyte solution. The passivation layer increases impedance for the co-intercalation of lithium ions into a positive electrode active material. Also, during repeated charge and discharge cycles, structural collapse of $LiCoO_2$, $LiMn_2O_4$, or $LiNiO_2$, as a positive electrode active material, or a chemical dissolution reaction by the electrolyte solution occurs so that cobalt (Co), manganese (Mn), nickel (Ni), iron (Fe), and aluminum (Al) foreign matters are dissolved from the positive electrode active material. These reactions not only lead to performance degradation of the positive electrode itself, but also cause a phenomenon in which the dissolved metallic foreign matters are precipitated and electrodeposited on the surface of a negative electrode. Furthermore, since the metallic foreign matter electrodeposited on the negative electrode reduces the mobility of lithium ions while exhibiting a high reactivity with respect to the electrolyte solution, an irreversible reaction according to charging and discharging is increased due to a reduction in the amount of lithium and, as a result, capacity and charge and discharge efficiency of the battery are reduced.

Typically, a method has been proposed in which the dissolution of the metallic foreign matter present in the battery is suppressed by including an additive in the electrolyte solution. However, it is not known how long the suppression reaction by the additive will last, and furthermore, since the suppression effect is reduced over time, the low-voltage phenomenon may occur when the dissolution of the metallic foreign matter is no longer suppressed.

Therefore, in the present invention, the dissolution of positive electrode metal ions or the metallic foreign matter, which may be included in the preparation process, may be suppressed and a stable film may be formed on the surfaces of the negative electrode and the positive electrode by including the compound including a propargyl group having metal ion adsorbability, a non-aqueous electrolyte solution additive component, as the first additive.

(4) Second Additive

An organic film formed on the surface of the positive electrode by the compound represented by Formula 1 has a limitation in that it is thermally unstable. Thus, in order to improve such limitation in the present invention, a film, in which thermal stability is improved by including an inorganic component on the surface of the positive electrode, may be formed by further using the second additive in the form of a salt, such as LiDFP, as a second additive component together in the non-aqueous electrolyte solution.

In this case, in the non-aqueous electrolyte solution for a lithium secondary battery according to the embodiment of the present invention, the lithium difluorophosphate, as the second additive, may be included in an amount of 0.01 wt % to 8.5 wt %, particularly 0.1 wt % to 7 wt %, more particularly 0.1 wt % to 5 wt %, and most particularly 0.5 wt % to 3 wt % based on a total weight of the non-aqueous electrolyte solution.

In a case in which the second additive is included in an amount within the above range, since a film having excellent thermal stability may be formed on the surface of the electrode, output of the secondary battery may be improved.

If the amount of the second additive is less than 0.01 wt %, an SEI-forming effect may be insignificant. Specifically, in a case in which the second additive is included in an amount of 0.01 wt % or more, for example, 0.1 wt % or more, the surface of the electrode may be stabilized by a process of forming the SEI in a lithium ion battery, and cycle characteristics and capacity characteristics after high-temperature storage may be improved. Also, if the second additive is included in an amount of 7 wt % or less, for example, 5 wt % or less, a side reaction due to the excessive amount of the additive may be suppressed.

(5) Third Additive

Also, since the non-aqueous electrolyte solution for a lithium secondary battery according to the embodiment of the present invention further includes tetravinylsilane as a third additive, the tetravinylsilane is bonded with the compound represented by Formula 1, as the first additive, to be able to form a double or triple stronger film on the surface of the negative electrode.

In this case, the third additive may be included in an amount of 0.01 wt % to 5 wt %, particularly 0.01 wt % to 3 wt %, and more particularly 0.1 wt % to 3 wt % based on the total weight of the non-aqueous electrolyte solution.

In a case in which the third additive is included in an amount within the above range, a secondary battery having more improved overall performance may be prepared. For example, in a case in which the third additive is included in an amount of 0.01 wt % or more, there is an effect of improving durability of the SEI while suppressing the increase in resistance as much as possible, and, in a case in which the third additive is included in an amount of 5 wt % or less, there is an effect of long-term maintenance and repair of the SEI within the increase in resistance which may be accommodated.

(6) Fourth Additive for Forming SEI

Furthermore, in order to further improve low-temperature high-rate discharge characteristics, high-temperature stability, overcharge protection, and an effect of improving swelling during high-temperature storage, the non-aqueous electrolyte solution of the present invention may further include an additive for forming an SEI which may form a more stable ion conductive film on the surface of the electrode, if necessary.

Specifically, as a representative example, the additional additive may include at least one additive for forming an SEI which is selected from the group consisting of a sultone-based compound, a halogen-substituted carbonate-based compound, a nitrile-based compound, a cyclic sulfite-based compound, and a cyclic carbonate-based compound.

The sultone-based compound may include at least one compound selected from the group consisting of 1,3-propane sultone (PS), 1,4-butane sultone, ethane sultone, 1,3-propene sultone (PRS), 1,4-butene sultone, and 1-methyl-1,3-propene sultone. The sultone-based compound may be included in an amount of 0.3 wt % to 5 wt %, for example, 1 wt % to 5 wt % based on a total weight of the non-aqueous electrolyte solution. In a case in which the amount of the sultone-based compound in the non-aqueous electrolyte solution is greater than 5 wt %, since a thick film is formed due to the excessive amount of the additive, output degradation and an increase in resistance may occur.

Also, the halogen-substituted carbonate-based compound may include fluoroethylene carbonate (FEC) and may be included in an amount of 5 wt % or less based on the total weight of the non-aqueous electrolyte solution. In a case in which the amount of the halogen-substituted carbonate-based compound is greater than 5 wt %, cell swelling performance may deteriorate.

Furthermore, the nitrile-based compound may include at least one compound selected from the group consisting of succinonitrile (NA), adiponitrile (Adn), acetonitrile, propionitrile, butyronitrile, valeronitrile, caprylonitrile, heptanenitrile, cyclopentane carbonitrile, cyclohexane carbonitrile, 2-fluorobenzonitrile, 4-fluorobenzonitrile, difluorobenzonitrile, trifluorobenzonitrile, phenylacetonitrile, 2-fluorophenylacetonitrile, and 4-fluorophenylacetonitrile.

The nitrile-based compound may be included in an amount of 5 wt % to 8 wt %, for example, 6 wt % to 8 wt % based on the total weight of the non-aqueous electrolyte solution. In a case in which the total amount of the nitrile-based compound in the non-aqueous electrolyte solution is greater than 8 wt %, since the resistance is increased due to an increase in the film formed on the surface of the electrode, battery performance may deteriorate.

Also, the cyclic sulfite-based compound may include ethylene sulfite, methyl ethylene sulfite, ethyl ethylene sulfite, 4,5-dimethyl ethylene sulfite, 4,5-diethyl ethylene sulfite, propylene sulfite, 4,5-dimethyl propylene sulfite, 4,5-diethyl propylene sulfite, 4,6-dimethyl propylene sulfite, 4,6-diethyl propylene sulfite, and 1,3-butylene glycol sulfite, and may be included in an amount of 5 wt % or less based on the total weight of the non-aqueous electrolyte solution. In a case in which the amount of the cyclic sulfite-based compound is greater than 5 wt %, since a thick film is formed due to the excessive amount of the additive, the output degradation and the increase in resistance may occur.

The cyclic carbonate-based compound may include vinylene carbonate (VC) or vinyl ethylene carbonate, and may be included in an amount of 3 wt % or less based on the total weight of the non-aqueous electrolyte solution. In a case in which the amount of the cyclic carbonate-based compound in the non-aqueous electrolyte solution is greater than 3 wt %, cell swelling inhibition performance may deteriorate.

Secondary Battery

Also, in an embodiment of the present invention, provided is a lithium secondary battery including the electrolyte solution of the present invention.

The lithium secondary battery of the present invention may be prepared by injecting the non-aqueous electrolyte solution of the present invention into an electrode assembly composed of a positive electrode, a negative electrode, and a separator disposed between the positive electrode and the negative electrode.

In this case, any positive electrode, negative electrode, and separator, which have typically been used in the preparation of a lithium secondary battery, may be used as the positive electrode, negative electrode, and separator which constitute the electrode assembly.

(1) Positive Electrode

First, the positive electrode may be prepared by forming a positive electrode material mixture layer on a positive electrode collector. The positive electrode material mixture layer may be formed by coating the positive electrode collector with a positive electrode slurry including a positive electrode active material, a binder, a conductive agent, and a solvent, and then drying and rolling the coated positive electrode collector.

The positive electrode collector is not particularly limited so long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used.

The positive electrode active material is a compound capable of reversibly intercalating and deintercalating lithium, wherein the positive electrode active material may specifically include a lithium composite metal oxide including lithium and at least one metal such as cobalt, manganese, nickel, or aluminum. Specifically, the lithium composite metal oxide may include lithium-manganese-based oxide (e.g., $LiMnO_2$, $LiMn_2O_4$, etc.), lithium-cobalt-based oxide (e.g., $LiCoO_2$, etc.), lithium-nickel-based oxide (e.g., $LiNiO_2$, etc.), lithium-nickel-manganese-based oxide (e.g., $LiNi_{1-Y}Mn_YO_2$ (where 0<Y<1), $LiMn_{2-Z}Ni_ZO_4$ (where 0<Z<2), etc.), lithium-nickel-cobalt-based oxide (e.g., $LiNi_{1-Y1}Co_{Y1}O_2$ (where 0<Y1<1), lithium-manganese-cobalt-based oxide (e.g., $LiCo_{1-Y2}Mn_{Y2}O_2$ (where 0<Y2<1), $LiMn_{2-Z1}Co_{Z1}O_4$ (where 0<Z1<2), etc.), lithium-nickel-manganese-cobalt-based oxide (e.g., $Li(Ni_pCo_qMn_{r1})O_2$ (where 0<p<1, 0<q<1, 0<r1<1, and p+q+r1=1) or $Li(Ni_{p1}Co_{q1}Mn_{r2})O_4$ (where 0<p1<2, 0<q1<2, 0<r2<2, and p1+q1+r2=2), etc.), or lithium-nickel-cobalt-transition metal (M) oxide (e.g., $Li(Ni_{p2}CO_{q2}Mn_{r3}M_{S2})O_2$ (where M is selected from the group consisting of aluminum (Al), iron (Fe), vanadium (V), chromium (Cr), titanium (Ti), tantalum (Ta), magnesium (Mg), and molybdenum (Mo), and p2, q2, r3, and s2 are atomic fractions of each independent elements, wherein 0<p2<1, 0<q2<1, 0<r3<1, 0<S2<1, and p2+q2+r3+S2=1), etc.), and any one thereof or two or more compounds thereof may be included.

Among these materials, in terms of the improvement of capacity characteristics and stability of the battery, the lithium composite metal oxide may include $LiCoO_2$, $LiMnO_2$, $LiNiO_2$, lithium nickel manganese cobalt oxide (e.g., $Li(Ni_{1/3}Mn_{1/3}Co_{1/3})O_2$, $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, or $Li(Ni_{0.8}Mn_{0.1}Co_{0.1})O_2$), or lithium nickel cobalt aluminum oxide (e.g., $LiNi_{0.8}Co_{0.15}Al_{0.05}O_2$, etc.).

The positive electrode active material may be included in an amount of 40 wt % to 90 wt %, for example, 40 wt % to 75 wt % based on a total weight of solid content in the positive electrode slurry.

The binder is a component that assists in the binding between the active material and the conductive agent and in the binding with the current collector, wherein the binder is commonly added in an amount of 1 wt % to 30 wt % based on the total weight of the solid content in the positive electrode slurry. Examples of the binder may be polyvinylidene fluoride (PVDF), polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene terpolymer (EPDM), a sulfonated EPDM, a styrene-butadiene rubber, a fluoro rubber, various copolymers, and the like.

The conductive agent is commonly added in an amount of 1 wt % to 30 wt % based on the total weight of the solid content in the positive electrode slurry.

Any conductive agent may be used without particular limitation so long as it has suitable conductivity without causing adverse chemical changes in the battery, and, for example, a conductive material such as: graphite; a carbon-based material such as carbon black, acetylene black, Ketjen black, channel black, furnace black, lamp black, and thermal black; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives may be used.

The solvent may include an organic solvent, such as N-methyl-2-pyrrolidone (NMP), and may be used in an amount such that desirable viscosity is obtained when the positive electrode active material as well as selectively the binder and the conductive agent are included. For example, the solvent may be included in an amount such that a concentration of the solid content in the slurry including the positive electrode active material as well as selectively the binder and the conductive agent is in a range of 10 wt % to 70 wt %, for example, 20 wt % to 60 wt %.

(2) Negative Electrode

Also, the negative electrode may be prepared by forming a negative electrode material mixture layer on a negative electrode collector. The negative electrode material mixture layer may be formed by coating the negative electrode collector with a slurry including a negative electrode active material, a binder, a conductive agent, and a solvent, and then drying and rolling the coated negative electrode collector.

The negative electrode collector generally has a thickness of 3 μm to 500 μm. The negative electrode collector is not particularly limited so long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, an aluminum-cadmium alloy, or the like may be used. Also, similar to the positive electrode collector, the negative electrode collector may have fine surface roughness to improve bonding strength with the negative electrode active material, and the negative electrode collector may be used in various shapes such as a film, a sheet, a foil, a net, a porous body, a foam body, a non-woven fabric body, and the like.

Furthermore, the negative electrode active material may include a single material selected from the group consisting of a lithium-containing titanium composite oxide (LTO); a carbon-based material such as non-graphitizable carbon and graphite-based carbon; a complex metal oxide such as $Li_xFe_2O_3$ (0≤x≤1), $Li_xWO_2$ (0≤x≤1), and $Sn_xMe_{1-x}Me'_yO_z$ (Me: manganese (Mn), iron (Fe), lead (Pb), or germanium (Ge); Me': aluminum (Al), boron (B), phosphorus (P), silicon (Si), Groups I, II and III elements of the periodic table, or halogen; 0≤x≤1; 1≤y≤3; 1≤z≤8); a lithium metal; a lithium alloy; a silicon-based alloy; a tin-based alloy; a metal oxide such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; and a conductive polymer, such as polyacetylene, or a mixture of two or more thereof.

The negative electrode active material may be included in an amount of 80 wt % to 99 wt % based on a total weight of solid content in the negative electrode slurry.

The binder is a component that assists in the binding between the conductive agent, the active material, and the current collector, wherein the binder is commonly added in an amount of 1 wt % to 30 wt % based on the total weight of the solid content in the negative electrode slurry. Examples of the binder may be polyvinylidene fluoride (PVDF), polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene polymer (EPDM), a sulfonated EPDM, a styrene-butadiene rubber, a fluoro rubber, and various copolymers thereof.

The conductive agent is a component for further improving the conductivity of the negative electrode active material, wherein the conductive agent may be added in an amount of 1 wt % to 20 wt % based on the total weight of the solid content in the negative electrode slurry. Any conductive agent may be used without particular limitation so long as it has conductivity without causing adverse chemical changes in the battery, and, for example, a conductive material, such as: graphite such as natural graphite or artificial graphite; carbon black such as acetylene black, Ketjen black, channel black, furnace black, lamp black, and thermal black; conductive fibers such as carbon fibers and metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used.

The solvent may include water or an organic solvent, such as NMP and alcohol, and may be used in an amount such that desirable viscosity is obtained when the negative electrode active material as well as selectively the binder and the conductive agent are included. For example, the solvent may be included in an amount such that a concentration of the solid content in the slurry including the negative electrode active material as well as selectively the binder and the conductive agent is in a range of 50 wt % to 75 wt %, for example, 50 wt % to 65 wt %.

Also, the separator plays a role in blocking an internal short circuit between both electrodes and impregnating the electrolyte, wherein, after mixing a polymer resin, a filler, and a solvent to prepare a separator composition, the separator composition is directly coated on the electrode and dried to form a separator film, or, after the separator composition is cast on a support and dried, the separator may be prepared by laminating a separator film peeled from the support on the electrode.

A typically used porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, may be used alone or in a lamination therewith as the separator. Also, a typical porous nonwoven fabric, for example, a nonwoven fabric formed of high melting point glass fibers or polyethylene terephthalate fibers may be used, but the present invention is not limited thereto.

In this case, the porous separator may generally have a pore diameter of 0.01 μm to 50 μm and a porosity of 5% to 95%. Also, the porous separator may generally have a thickness of 5 μm to 300 μm.

A shape of the lithium secondary battery of the present invention is not particularly limited, but a cylindrical type using a can, a prismatic type, a pouch type, or a coin type may be used.

Hereinafter, the present invention will be described in more detail according to examples. However, the invention may be embodied in many different forms and should not be construed as being limited to the embodiments set forth herein. Rather, these example embodiments are provided so that this description will be thorough and complete, and will fully convey the scope of the present invention to those skilled in the art.

EXAMPLES

Example 1

(Non-Aqueous Electrolyte Solution Preparation)

A non-aqueous electrolyte solution of the present invention was prepared by adding 1 g of the compound of Formula 1a, as a first additive, and 1 g of LiDFP, as a second additive, to 98 g of an organic solvent (ethylene carbonate (EC):ethyl methyl carbonate (EMC)=volume ratio of 30:70) in which 1.0 M $LiPF_6$ was dissolved.

(Positive Electrode Preparation)

Lithium cobalt composite oxide ($LiCoO_2$) as positive electrode active material particles, carbon black as a conductive agent, and polyvinylidene fluoride (PVDF), as a binder, were added to N-methyl-2-pyrrolidone (NMP), as a solvent, in a ratio of 90:5:5 (wt %) to prepare a positive electrode active material slurry (solid content 50 wt %). A 100 μm thick positive electrode collector (Al thin film) was coated with the positive electrode active material slurry, dried, and roll-pressed to prepare a positive electrode.

(Negative Electrode Preparation)

Natural graphite, as a negative electrode active material, PVDF as a binder, and carbon black, as a conductive agent, were added to NMP, as a solvent, in a ratio of 95:2:3 (wt %) to prepare a negative electrode active material slurry (solid content 60 wt %). A 90 μm thick negative electrode collector (Cu thin film) was coated with the negative electrode active material slurry, dried, and roll-pressed to prepare a negative electrode.

(Secondary Battery Preparation)

After an electrode assembly was prepared by stacking a polyethylene porous film, as a separator, with the positive electrode and negative electrode prepared by the above-described methods, the electrode assembly was put in a battery case, the non-aqueous electrolyte solution was injected thereinto, and the battery case was sealed to prepare a lithium secondary battery (battery capacity 5.5 mAh). In this case, Fe particles, as foreign substance for evaluating the effect of adsorbing the metallic (Fe) foreign matter, having a diameter of 280 μm to 330 μm were disposed between the positive electrode and the separator.

Examples 2

A non-aqueous electrolyte solution and a secondary battery including the same were prepared in the same manner as in Example 1 except that the compound of Formula 1b, instead of the compound of Formula 1a, was added during the preparation of the non-aqueous electrolyte solution.

Example 3

A non-aqueous electrolyte solution and a secondary battery including the same were prepared in the same manner as in Example 1 except that the compound of Formula 1c, instead of the compound of Formula 1a, was added during the preparation of the non-aqueous electrolyte solution.

Example 4

A non-aqueous electrolyte solution and a secondary battery including the same were prepared in the same manner as in Example 1 except that the compound of Formula id, instead of the compound of Formula 1a, was added during the preparation of the non-aqueous electrolyte solution.

Example 5

A non-aqueous electrolyte solution and a secondary battery including the same were prepared in the same manner as in Example 1 except that the compound of Formula 1e, instead of the compound of Formula 1a, was added during the preparation of the non-aqueous electrolyte solution.

Example 6

A non-aqueous electrolyte solution and a secondary battery including the same were prepared in the same manner as in Example 1 except that the compound of Formula if, instead of the compound of Formula 1a, was added during the preparation of the non-aqueous electrolyte solution.

Example 7

A non-aqueous electrolyte solution and a secondary battery including the same were prepared in the same manner as in Example 1 except that the compound of Formula 1g, instead of the compound of Formula 1a, was added during the preparation of the non-aqueous electrolyte solution.

Example 8

A non-aqueous electrolyte solution and a secondary battery including the same were prepared in the same manner as in Example 1 except that the compound of Formula 1h, instead of the compound of Formula 1a, was added during the preparation of the non-aqueous electrolyte solution.

Example 9

A non-aqueous electrolyte solution and a secondary battery including the same were prepared in the same manner as in Example 1 except that the compound of Formula ii, instead of the compound of Formula 1a, was added during the preparation of the non-aqueous electrolyte solution.

Example 10

A non-aqueous electrolyte solution and a secondary battery including the same were prepared in the same manner as in Example 1 except that the compound of Formula 1j, instead of the compound of Formula 1a, was added during the preparation of the non-aqueous electrolyte solution.

Example 11

A non-aqueous electrolyte solution and a secondary battery including the same were prepared in the same manner as in Example 1 except that the compound of Formula 1k, instead of the compound of Formula 1a, was added during the preparation of the non-aqueous electrolyte solution.

Example 12

A non-aqueous electrolyte solution and a secondary battery including the same were prepared in the same manner as in Example 1 except that the compound of Formula 1l, instead of the compound of Formula 1a, was added during the preparation of the non-aqueous electrolyte solution.

Example 13

A non-aqueous electrolyte solution and a secondary battery including the same were prepared in the same manner as in Example 1 except that the compound of Formula 1m, instead of the compound of Formula 1a, was added during the preparation of the non-aqueous electrolyte solution.

Example 14

A non-aqueous electrolyte solution and a secondary battery including the same were prepared in the same manner as in Example 1 except that the compound of Formula in, instead of the compound of Formula 1a, was added during the preparation of the non-aqueous electrolyte solution.

Example 15

A non-aqueous electrolyte solution and a secondary battery including the same were prepared in the same manner as in Example 1 except that the compound of Formula 1o, instead of the compound of Formula 1a, was added during the preparation of the non-aqueous electrolyte solution.

Example 16

A non-aqueous electrolyte solution and a secondary battery including the same were prepared in the same manner as in Example 1 except that the compound of Formula 1p, instead of the compound of Formula 1a, was added during the preparation of the non-aqueous electrolyte solution.

Example 17

A non-aqueous electrolyte solution of the present invention was prepared by adding 1 g of the compound of Formula 1a, as a first additive, 1 g of LiDFP, as a second additive, and 0.2 g of tetravinylsilane, as a third additive, to 97.8 g of an organic solvent (ethylene carbonate (EC):ethyl methyl carbonate (EMC)=volume ratio of 30:70), in which 1.0 M $LiPF_6$ was dissolved, during the preparation of the non-aqueous electrolyte solution.

Subsequently, a secondary battery including the non-aqueous electrolyte solution was prepared in the same manner as in Example 1.

Example 18

A non-aqueous electrolyte solution of the present invention was prepared by adding 1 g of the compound of Formula 1k, as a first additive, 1 g of LiDFP, as a second additive, and 0.2 g of tetravinylsilane, as a third additive, to 97.8 g of an organic solvent (ethylene carbonate (EC):ethyl methyl carbonate (EMC)=volume ratio of 30:70), in which 1.0 M LiPF$_6$ was dissolved, during the preparation of the non-aqueous electrolyte solution.

Subsequently, a secondary battery including the non-aqueous electrolyte solution was prepared in the same manner as in Example 1.

Example 19

A non-aqueous electrolyte solution of the present invention was prepared by adding 7 g of the compound of Formula 1a, as a first additive, and 7 g of LiDFP, as a second additive, to 86 g of an organic solvent (ethylene carbonate (EC):ethyl methyl carbonate (EMC)=volume ratio of 30:70), in which 1.0 M LiPF$_6$ was dissolved, during the preparation of the non-aqueous electrolyte solution.

Subsequently, a secondary battery including the non-aqueous electrolyte solution was prepared in the same manner as in Example 1.

Example 20

A non-aqueous electrolyte solution of the present invention was prepared by adding 5 g of the compound of Formula 1a, as a first additive, and 5 g of LiDFP, as a second additive, to 90 g of an organic solvent (ethylene carbonate (EC):ethyl methyl carbonate (EMC)=volume ratio of 30:70), in which 1.0 M LiPF$_6$ was dissolved, during the preparation of the non-aqueous electrolyte solution.

Subsequently, a secondary battery including the non-aqueous electrolyte solution was prepared in the same manner as in Example 1.

Comparative Example 1

A non-aqueous electrolyte solution and a lithium secondary battery including the same were prepared in the same manner as in Example 1 except that the first and second additives were not included during the preparation of the non-aqueous electrolyte solution in Example 1.

Comparative Example 2

A non-aqueous electrolyte solution was prepared by including 1 g of the compound of Formula 1a, as a first additive, in 99 g of an organic solvent (ethylene carbonate (EC):ethyl methyl carbonate (EMC)=volume ratio of 30:70), in which 1.0 M LiPF$_6$ was dissolved, and not including a second additive during the preparation of the non-aqueous electrolyte solution.

A lithium secondary battery including the non-aqueous electrolyte solution was prepared in the same manner as in Example 1.

Comparative Example 3

A non-aqueous electrolyte solution was prepared by including 1 g of a second additive in 99 g of an organic solvent (ethylene carbonate (EC):ethyl methyl carbonate (EMC)=volume ratio of 30:70), in which 1.0 M LiPF$_6$ was dissolved, and not including a first additive during the preparation of the non-aqueous electrolyte solution.

A lithium secondary battery including the non-aqueous electrolyte solution was prepared in the same manner as in Example 1.

Comparative Example 4

A non-aqueous electrolyte solution and a lithium secondary battery including the same were prepared in the same manner as in Example 1 except that a compound of the following Formula 2, instead of the first additive, was included during the preparation of the non-aqueous electrolyte solution.

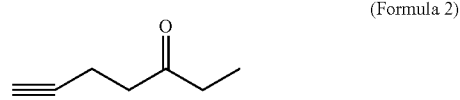

(Formula 2)

Comparative Example 5

A non-aqueous electrolyte solution was prepared by adding 13 g of the compound of Formula 1a, as a first additive, and 7 g of LiDFP, as a second additive, to 80 g of an organic solvent (ethylene carbonate (EC):ethyl methyl carbonate (EMC)=volume ratio of 30:70), in which 1.0 M LiPF$_6$ was dissolved, during the preparation of the non-aqueous electrolyte solution.

Subsequently, a secondary battery including the non-aqueous electrolyte solution was prepared in the same manner as in Example 1.

Comparative Example 6

A non-aqueous electrolyte solution was prepared by adding 7 g of the compound of Formula 1a, as a first additive, and 13 g of LiDFP, as a second additive, to 80 g of an organic solvent (ethylene carbonate (EC):ethyl methyl carbonate (EMC)=volume ratio of 30:70), in which 1.0 M LiPF$_6$ was dissolved, during the preparation of the non-aqueous electrolyte solution.

Subsequently, a secondary battery including the non-aqueous electrolyte solution was prepared in the same manner as in Example 1.

Comparative Example 7

A non-aqueous electrolyte solution was prepared by adding 10 g of the compound of Formula 1a, as a first additive, and 10 g of LiDFP, as a second additive, to 80 g of an organic solvent (ethylene carbonate (EC):ethyl methyl carbonate (EMC)=volume ratio of 30:70), in which 1.0 M LiPF$_6$ was dissolved, during the preparation of the non-aqueous electrolyte solution.

Subsequently, a secondary battery including the non-aqueous electrolyte solution was prepared in the same manner as in Example 1.

EXPERIMENTAL EXAMPLES

Experimental Example 1

After eight samples for each of the lithium secondary batteries prepared in Examples 1 to 20 and Comparative Examples 1 to 7 were prepared, each secondary battery was charged at a constant current of 0.1 C to a voltage of 4.2 V at 25° C. Thereafter, each secondary battery was charged at a constant voltage of 4.2 V and the charge was terminated when a charge current became 0.275 mA. Thereafter, after each battery was left standing for 10 minutes, each battery was discharged at a constant current of 0.5 C to a voltage of 3.0 V. The number of chargeable and dischargeable secondary batteries among the eight secondary batteries prepared in each Example and Comparative Example was checked and listed in the following Table 1.

TABLE 1

| Examples | Lithium salt | Amount of organic solvent added (g) | First additive Formula | First additive Addition amount (g) | Amount of second additive added (g) | Amount of third additive added (g) | The number of chargeable and dischargeable batteries (chargeable/prepared) |
|---|---|---|---|---|---|---|---|
| Example 1 | 1.0M LiPF$_6$ | 98 | 1a | 1 | 1 | — | 8/8 |
| Example 2 | 1.0M LiPF$_6$ | 98 | 1b | 1 | 1 | — | 7/8 |
| Example 3 | 1.0M LiPF$_6$ | 98 | 1c | 1 | 1 | — | 7/8 |
| Example 4 | 1.0M LiPF$_6$ | 98 | 1d | 1 | 1 | — | 7/8 |
| Example 5 | 1.0M LiPF$_6$ | 98 | 1e | 1 | 1 | — | 6/8 |
| Example 6 | 1.0M LiPF$_6$ | 98 | 1f | 1 | 1 | — | 7/8 |
| Example 7 | 1.0M LiPF$_6$ | 98 | 1g | 1 | 1 | — | 6/8 |
| Example 8 | 1.0M LiPF$_6$ | 98 | 1h | 1 | 1 | — | 6/8 |
| Example 9 | 1.0M LiPF$_6$ | 98 | 1i | 1 | 1 | — | 7/8 |
| Example 10 | 1.0M LiPF$_6$ | 98 | 1j | 1 | 1 | — | 6/8 |
| Example 11 | 1.0M LiPF$_6$ | 98 | 1k | 1 | 1 | — | 6/8 |
| Example 12 | 1.0M LiPF$_6$ | 98 | 1l | 1 | 1 | — | 6/8 |
| Example 13 | 1.0M LiPF$_6$ | 98 | 1m | 1 | 1 | — | 7/8 |
| Example 14 | 1.0M LiPF$_6$ | 98 | 1n | 1 | 1 | — | 7/8 |
| Example 15 | 1.0M LiPF$_6$ | 98 | 1o | 1 | 1 | — | 7/8 |
| Example 16 | 1.0M LiPF$_6$ | 98 | 1p | 1 | 1 | — | 6/8 |
| Example 17 | 1.0M LiPF$_6$ | 97.8 | 1a | 1 | 1 | 0.2 | 8/8 |
| Example 18 | 1.0M LiPF$_6$ | 97.8 | 1k | 1 | 1 | 0.2 | 7/8 |
| Example 19 | 1.0M LiPF$_6$ | 86 | 1a | 7 | 7 | — | 8/8 |
| Example 20 | 1.0M LiPF$_6$ | 90 | 1a | 5 | 5 | — | 8/8 |
| Comparative Example 1 | 1.0M LiPF$_6$ | 100 | — | — | — | — | 1/8 |
| Comparative Example 2 | 1.0M LiPF$_6$ | 99 | 1a | 1 | — | — | 7/8 |
| Comparative Example 3 | 1.0M LiPF$_6$ | 99 | — | — | 1 | — | 2/8 |
| Comparative Example 4 | 1.0M LiPF$_6$ | 98 | 2 | 1 | 1 | — | 1/8 |
| Comparative Example 5 | 1.0M LiPF$_6$ | 80 | 1a | 13 | 7 | — | 8/8 |
| Comparative Example 6 | 1.0M LiPF$_6$ | 80 | 1a | 7 | 13 | — | 8/8 |
| Comparative Example 7 | 1.0M LiPF$_6$ | 80 | 1a | 10 | 10 | — | 8/8 |

Referring to Table 1, with respect to the secondary batteries of Examples 1 to 20, since the first additive removed dissolved metal by forming a complex with metallic foreign matter and simultaneously formed a film on the surface of the positive electrode, and LiDFP, as the second additive, improved thermal stability by increasing an inorganic component on the film, it may be understood that 60% or more of the prepared batteries were chargeable and dischargeable.

In contrast, with respect to the secondary battery of Comparative Example 1 which included the non-aqueous electrolyte solution not including both the first additive and the second additive, the number of chargeable and dischargeable cells was 1, and, with respect to the secondary battery of Comparative Example 3 which included the non-aqueous electrolyte solution only including the second additive, it may be understood that the number of chargeable and dischargeable cells was 2.

Also, since the secondary battery of Comparative Example 4, which included the non-aqueous electrolyte solution including the compound of Formula 2, instead of the compound of Formula 1, as a first additive, did not include an additive capable of adsorbing the metallic (Fe) foreign matter, it may be understood that the number of chargeable and dischargeable cells was 1.

With respect to the secondary battery of Comparative Example 2, which included the non-aqueous electrolyte solution only including the first additive, and the secondary batteries of Comparative Examples 5 to 7 which respectively included the non-aqueous electrolyte solutions including the excessive amount of the first additive and/or the second additive, it may be understood that 80% or more of the prepared batteries were chargeable and dischargeable.

Experimental Example 2

After each of the secondary batteries prepared in Examples 1 to 20 and Comparative Examples 1 to 7 was charged at a 0.8 C rate to 4.2 V under a constant current/constant voltage condition and stored at 45° C. for 6 days, voltages at 45° C. were measured and an average value thereof is listed in the following Table 2.

TABLE 2

| Examples | Lithium salt | Amount of organic solvent added (g) | First additive Formula | First additive Addition amount (g) | Amount of second additive added (g) | Amount of third additive added (g) | Voltage after high-temperature storage (V) |
| --- | --- | --- | --- | --- | --- | --- | --- |
| Example 1 | 1.0M LiPF$_6$ | 98 | 1a | 1 | 1 | — | 4.13 |
| Example 2 | 1.0M LiPF$_6$ | 98 | 1b | 1 | 1 | — | 4.08 |
| Example 3 | 1.0M LiPF$_6$ | 98 | 1c | 1 | 1 | — | 4.07 |
| Example 4 | 1.0M LiPF$_6$ | 98 | 1d | 1 | 1 | — | 4.08 |
| Example 5 | 1.0M LiPF$_6$ | 98 | 1e | 1 | 1 | — | 4.05 |
| Example 6 | 1.0M LiPF$_6$ | 98 | 1f | 1 | 1 | — | 4.08 |
| Example 7 | 1.0M LiPF$_6$ | 98 | 1g | 1 | 1 | — | 4.06 |
| Example 8 | 1.0M LiPF$_6$ | 98 | 1h | 1 | 1 | — | 4.04 |
| Example 9 | 1.0M LiPF$_6$ | 98 | 1i | 1 | 1 | — | 4.05 |
| Example 10 | 1.0M LiPF$_6$ | 98 | 1j | 1 | 1 | — | 4.06 |
| Example 11 | 1.0M LiPF$_6$ | 98 | 1k | 1 | 1 | — | 4.06 |
| Example 12 | 1.0M LiPF$_6$ | 98 | 1l | 1 | 1 | — | 4.08 |
| Example 13 | 1.0M LiPF$_6$ | 98 | 1m | 1 | 1 | — | 4.10 |
| Example 14 | 1.0M LiPF$_6$ | 98 | 1n | 1 | 1 | — | 4.07 |
| Example 15 | 1.0M LiPF$_6$ | 98 | 1o | 1 | 1 | — | 4.08 |
| Example 16 | 1.0M LiPF$_6$ | 98 | 1p | 1 | 1 | — | 4.05 |
| Example 17 | 1.0M LiPF$_6$ | 97.8 | 1a | 1 | 1 | 0.2 | 4.10 |
| Example 18 | 1.0M LiPF$_6$ | 97.8 | 1k | 1 | 1 | 0.2 | 4.08 |
| Example 19 | 1.0M LiPF$_6$ | 86 | 1a | 7 | 7 | — | 3.85 |
| Example 20 | 1.0M LiPF$_6$ | 90 | 1a | 5 | 5 | — | 3.96 |
| Comparative Example 1 | 1.0M LiPF$_6$ | 100 | — | — | — | — | 2.55 |
| Comparative Example 2 | 1.0M LiPF$_6$ | 99 | 1a | 1 | — | — | 4.03 |

TABLE 2-continued

| Examples | Lithium salt | Amount of organic solvent added (g) | First additive Formula | Addition amount (g) | Amount of second additive added (g) | Amount of third additive added (g) | Voltage after high-temperature storage (V) |
|---|---|---|---|---|---|---|---|
| Comparative Example 3 | 1.0M LiPF$_6$ | 99 | — | — | 1 | — | 2.63 |
| Comparative Example 4 | 1.0M LiPF$_6$ | 98 | 2 | 1 | 1 | — | 2.24 |
| Comparative Example 5 | 1.0M LiPF$_6$ | 80 | 1a | 13 | 7 | — | 3.83 |
| Comparative Example 6 | 1.0M LiPF$_6$ | 80 | 1a | 7 | 13 | — | 3.78 |
| Comparative Example 7 | 1.0M LiPF$_6$ | 80 | 1a | 10 | 10 | — | 3.72 |

Referring to Table 2, with respect to the secondary batteries of Examples 1 to 20 which included both the first and second additives, since the first additive compound removed the dissolved metal by forming a complex with the metallic foreign matter and simultaneously formed a film on the surface of the positive electrode and the LiDFP, as the second additive, improved thermal stability by increasing an inorganic component on the film, low voltage was prevented even after high-temperature storage, and thus, it may be understood that the voltage was maintained at about 3.85 V or more.

In contrast, with respect to the secondary battery of Comparative Example 1 which included the non-aqueous electrolyte solution not including both the first additive and the second additive and the secondary battery of Comparative Example 3 which included the non-aqueous electrolyte solution only including the second additive, it may be understood that the voltages after high-temperature storage were significantly low at 2.55 V and 2.63 V, respectively.

Also, since the secondary battery of Comparative Example 4, which included the non-aqueous electrolyte solution including the compound of Formula 2, instead of the compound of Formula 1, as a first additive, did not include an additive capable of adsorbing the metallic (Fe) foreign matter, it may be understood that the voltage after high-temperature storage was significantly low at 2.24 V.

With respect to the secondary batteries of Comparative Examples 5 to 7 which respectively included the non-aqueous electrolyte solutions including the excessive amount of the first additive and/or the second additive, voltages after high-temperature storage were 3.83 V, 3.78 V, and 3.72 V, respectively, due to the side reaction of the additive and the increase in resistance in the secondary battery, wherein it may be understood that the voltages were lower than those of the secondary batteries of Examples 1 to 20.

With respect to the secondary battery of Comparative Example 2 which included the non-aqueous electrolyte solution only including the first additive effective in improving low voltage, the voltage after high-temperature storage was 4.03 V, wherein it may be understood that the voltage was slightly reduced in comparison to those of the secondary batteries of Examples 1 to 20.

Experimental Example 3

Each of the secondary batteries prepared in Examples 1 to 20 and Comparative Examples 1 to 7 was charged at a 0.8 C rate to 4.35 V under a constant current/constant voltage condition, cut-off charged at 0.05 C, and discharged at 0.5 C to a voltage of 3.0 V (initial discharge capacity). Subsequently, each of the secondary batteries was charged at a 0.8 C rate to 4.35 V under a constant current/constant voltage condition, cut-off charged at 0.05 C, and stored at 60° C. for 2 weeks. Thereafter, each battery was discharged at 0.5 C to a voltage of 3.0 V at room temperature and discharge capacity was measured (residual discharge capacity). Again, each battery was charged at a 0.8 C rate to 4.35 V under a constant current/constant voltage condition, cut-off charged at 0.05 C, and discharged at 0.5 C to a voltage of 3.0 V to measure discharge capacity (recovery discharge capacity). The residual discharge capacity and the recovery discharge capacity were expressed as a percentage (%) relative to the initial discharge capacity, and the results thereof are presented in the following Table 3.

Thereafter, discharging at 0.5 C to a voltage of 3.0 V at room temperature was set as one cycle, and capacity after 100 cycles was expressed as a percentage (%) relative to first cycle capacity and listed in Table 3 below.

TABLE 3

| Examples | Lithium salt | Amount of organic solvent added (g) | First additive Formula | Addition amount (g) | Amount of second additive added (g) | Amount of third additive added (g) | Residual discharge capacity (%) | Recovery discharge capacity (%) | Cycle capacity retention (%) |
|---|---|---|---|---|---|---|---|---|---|
| Example 1 | 1.0M LiPF$_6$ | 98 | 1a | 1 | 1 | — | 88 | 94 | 86 |
| Example 2 | 1.0M LiPF$_6$ | 98 | 1b | 1 | 1 | — | 86 | 92 | 83 |

TABLE 3-continued

| Examples | Lithium salt | Amount of organic solvent added (g) | First additive Formula | First additive Addition amount (g) | Amount of second additive added (g) | Amount of third additive added (g) | Residual discharge capacity (%) | Recovery discharge capacity (%) | Cycle capacity retention (%) |
|---|---|---|---|---|---|---|---|---|---|
| Example 3 | 1.0M LiPF$_6$ | 98 | 1c | 1 | 1 | — | 85 | 90 | 83 |
| Example 4 | 1.0M LiPF$_6$ | 98 | 1d | 1 | 1 | — | 85 | 88 | 82 |
| Example 5 | 1.0M LiPF$_6$ | 98 | 1e | 1 | 1 | — | 83 | 90 | 80 |
| Example 6 | 1.0M LiPF$_6$ | 98 | 1f | 1 | 1 | — | 84 | 90 | 82 |
| Example 7 | 1.0M LiPF$_6$ | 98 | 1g | 1 | 1 | — | 83 | 89 | 80 |
| Example 8 | 1.0M LiPF$_6$ | 98 | 1h | 1 | 1 | — | 83 | 86 | 81 |
| Example 9 | 1.0M LiPF$_6$ | 98 | 1i | 1 | 1 | — | 80 | 88 | 81 |
| Example 10 | 1.0M LiPF$_6$ | 98 | 1j | 1 | 1 | — | 81 | 88 | 83 |
| Example 11 | 1.0M LiPF$_6$ | 98 | 1k | 1 | 1 | — | 80 | 89 | 83 |
| Example 12 | 1.0M LiPF$_6$ | 98 | 1l | 1 | 1 | — | 78 | 90 | 80 |
| Example 13 | 1.0M LiPF$_6$ | 98 | 1m | 1 | 1 | — | 83 | 94 | 83 |
| Example 14 | 1.0M LiPF$_6$ | 98 | 1n | 1 | 1 | — | 84 | 90 | 82 |
| Example 15 | 1.0M LiPF$_6$ | 98 | 1o | 1 | 1 | — | 80 | 90 | 81 |
| Example 16 | 1.0M LiPF$_6$ | 98 | 1p | 1 | 1 | — | 83 | 88 | 79 |
| Example 17 | 1.0M LiPF$_6$ | 97.8 | 1a | 1 | 1 | 0.2 | 88 | 95 | 90 |
| Example 18 | 1.0M LiPF$_6$ | 97.8 | 1k | 1 | 1 | 0.2 | 84 | 92 | 88 |
| Example 19 | 1.0M LiPF$_6$ | 86 | 1a | 7 | 7 | — | 78 | 88 | 82 |
| Example 20 | 1.0M LiPF$_6$ | 90 | 1a | 5 | 5 | — | 80 | 90 | 85 |
| Comparative Example 1 | 1.0M LiPF$_6$ | 100 | — | — | — | — | 71 | 82 | 63 |
| Comparative Example 2 | 1.0M LiPF$_6$ | 99 | 1a | 1 | — | — | 86 | 92 | 76 |
| Comparative Example 3 | 1.0M LiPF$_6$ | 99 | — | — | 1 | — | 83 | 90 | 74 |
| Comparative Example 4 | 1.0M LiPF$_6$ | 98 | 2 | 1 | 1 | — | 66 | 77 | 69 |
| Comparative Example 5 | 1.0M LiPF$_6$ | 80 | 1a | 13 | 7 | — | 76 | 87 | 77 |
| Comparative Example 6 | 1.0M LiPF$_6$ | 80 | 1a | 7 | 13 | — | 80 | 85 | 75 |
| Comparative Example 7 | 1.0M LiPF$_6$ | 80 | 1a | 10 | 10 | — | 73 | 77 | 67 |

As illustrated in Table 3, with respect to the secondary batteries of Examples 1 to 20 which respectively included the non-aqueous electrolyte solutions including both the first and second additives, residual discharge capacities during high-temperature storage were about 78% or more, recovery discharge capacities were about 86% or more, and cycle capacity retentions were about 79% or more, wherein it may be understood that the residual capacities, recovery capacities, and cycle capacity retentions were all excellent.

In contrast, with respect to the secondary battery of Comparative Example 1 which included the non-aqueous electrolyte solution not including both the first and second additives, residual discharge capacity during high-temperature storage was about 71%, recovery discharge capacity was about 82%, and cycle capacity retention was about 63%, wherein it may be confirmed that overall performance was degraded in comparison to those of the secondary batteries of Examples 1 to 20.

Also, with respect to the secondary battery of Comparative Example 2 which included the non-aqueous electrolyte solution only including the compound of Formula 1a, the first additive, as the non-aqueous electrolyte solution additive, residual discharge capacity during high-temperature storage was about 86%, recovery discharge capacity was about 92%, and cycle capacity retention was about 76%, wherein it may be understood that the residual capacity, recovery capacity, and cycle capacity retention were significantly reduced in comparison to those of the secondary battery of Example 1.

Furthermore, with respect to the secondary battery of Comparative Example 3 which included the non-aqueous electrolyte solution only including the second additive as the non-aqueous electrolyte solution additive, since it did not include an additive capable of adsorbing the metallic (Fe) foreign matter, cycle capacity retention was about 74%, wherein it may be understood that the cycle capacity retention was reduced in comparison to those of the secondary batteries of Examples 1 to 20.

Also, since the secondary battery of Comparative Example 4, which included the non-aqueous electrolyte solution including the compound of Formula 2, instead of the compound of Formula 1, as a first additive, did not include an additive capable of adsorbing the metallic (Fe) foreign matter, residual discharge capacity during high-temperature storage was 66%, recovery discharge capacity was 77%, and cycle capacity retention was 69%, wherein it may be understood that the residual capacity, recovery capacity, and cycle capacity retention were significantly lower than those of the secondary batteries of Examples 1 to 20.

With respect to the secondary batteries of Comparative Examples 5 to 7 which respectively included the non-aqueous electrolyte solutions including the excessive amount of the first additive and/or the second additive, residual discharge capacities during high-temperature storage were respectively 76%, 80%, and 73%, recovery discharge capacities were respectively 87%, 85%, and 77%, and cycle capacity retentions were respectively 77%, 75%, and 67% due to the side reaction of the additive and the increase in resistance in the secondary battery, wherein it may be understood that the residual capacities, recovery capacities, and cycle capacity retentions were significantly reduced in comparison to those of the secondary batteries of Examples 1 to 20.

The invention claimed is:

1. A non-aqueous electrolyte solution for a lithium secondary battery, comprising:
   a lithium salt;
   an organic solvent;
   a compound represented by Formula 1 as a first additive;
   lithium difluorophosphate (LiDFP) as a second additive; and
   a third additive that is tetravinyl silane,
   wherein the first additive and the second additive are each independently included in an amount of 0.01 wt % to 8.5 wt %, and the third additive is included in an amount of 0.01 wt % to 5 wt %, based on a total amount of the non-aqueous electrolyte solution:

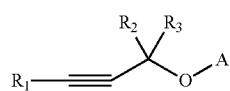

(Formula 1)

wherein, in Formula 1,
R$_1$ to R$_3$ are each independently hydrogen or a substituted or unsubstituted alkyl group having 1 to 6 carbon atoms, and
A is,

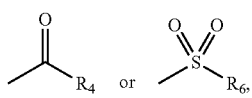

wherein R$_4$ and R$_6$ are each independently a substituted or unsubstituted alkyl group having 1 to 6 carbon atoms, a substituted or unsubstituted phenyl group, or —O—R$_5$, wherein R$_5$ is a substituted or unsubstituted alkyl group having 1 to 6 carbon atoms, a substituted or unsubstituted alkynyl group having 2 to 6 carbon atoms, or a substituted or unsubstituted phenyl group, wherein, in R$_1$ to R$_5$, the substituted alkyl group having 1 to 6 carbon atoms is substituted with at least one halogen element or with an alkyl group having 1 to 3 carbon atoms, wherein, in R$_4$ to R$_6$, the substituted phenyl group is substituted with at least one halogen element or with an alkyl group having 1 to 3 carbon atoms, and wherein, in R$_5$, the substituted alkynyl group having 2 to 6 carbon atoms is substituted with at least one halogen element or with an alkyl group having 1 to 3 carbon atoms.

2. The non-aqueous electrolyte solution for a lithium secondary battery of claim 1, wherein the halogen element is fluorine.

3. The non-aqueous electrolyte solution for a lithium secondary battery of claim 1, wherein the compound represented by Formula 1 comprises at least one selected from the group consisting of compounds represented by Formulae 1a to 1p:

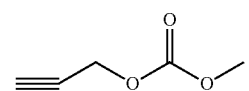

(Formula 1a)

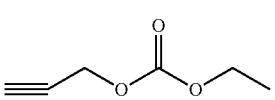

(Formula 1b)

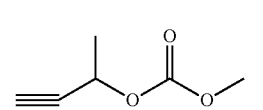

(Formula 1c)

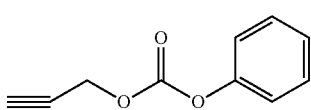

(Formula 1d)

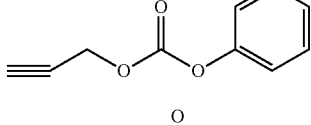

(Formula 1e)

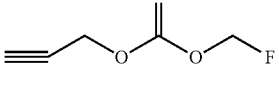

(Formula 1f)

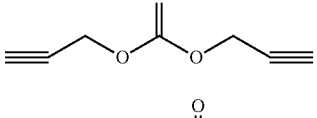

(Formula 1g)

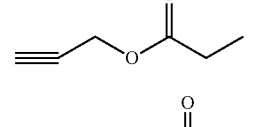

(Formula 1h)

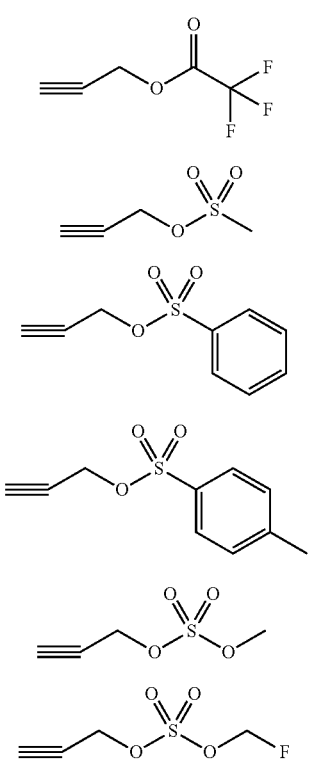

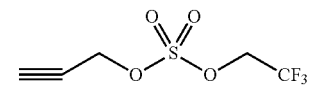

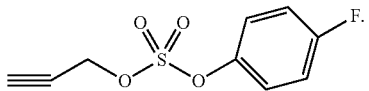

4. The non-aqueous electrolyte solution for a lithium secondary battery of claim 1, wherein the first additive is included in an amount of 0.1 wt % to 7 wt % based on the total amount of the non-aqueous electrolyte solution.

5. The non-aqueous electrolyte solution for a lithium secondary battery of claim 4, wherein the first additive is included in an amount of 0.1 wt % to 5 wt % based on the total amount of the non-aqueous electrolyte solution.

6. The non-aqueous electrolyte solution for a lithium secondary battery of claim 1, wherein the second additive is included in a weight of 0.1 wt % to 7 wt % based on the total weight of the non-aqueous electrolyte solution.

7. The non-aqueous electrolyte solution for a lithium secondary battery of claim 6, wherein the second additive is included in a weight of 0.1 wt % to 5 wt % based on the total weight of the non-aqueous electrolyte solution.

8. A lithium secondary battery comprising the non-aqueous electrolyte solution of claim 1.

* * * * *